March 15, 1966  A. W. ANGERHOFER  3,240,554
METHOD OF REMOVING OXYGEN FROM RELATIVELY
INERT CRUDE GASES
Filed Feb. 27, 1961  3 Sheets-Sheet 1

INVENTOR
ALVIN W. ANGERHOFER
BY
AGENT & ATTORNEY

March 15, 1966

A. W. ANGERHOFER 3,240,554

METHOD OF REMOVING OXYGEN FROM RELATIVELY INERT CRUDE GASES

Filed Feb. 27, 1961

INVENTOR
ALVIN W. ANGERHOFER
BY

AGENT & ATTORNEY

March 15, 1966 A. W. ANGERHOFER 3,240,554
METHOD OF REMOVING OXYGEN FROM RELATIVELY
INERT CRUDE GASES
Filed Feb. 27, 1961 3 Sheets-Sheet 3

FIG. 3A

TEMPERATURES IN REACTOR CATALYST BED REMOVING
OXYGEN FROM NITROGEN WITH EXCESS OF HYDROGEN

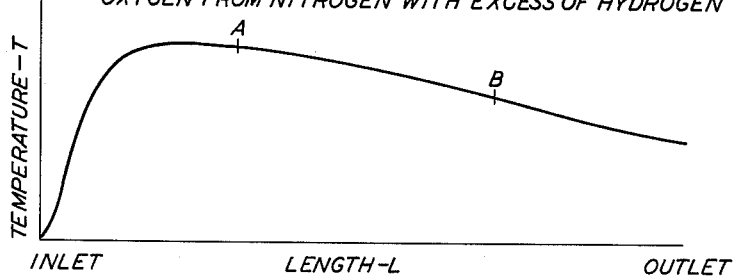

FIG. 3B

TEMPERATURES IN REACTOR CATALYST BED REMOVING
OXYGEN FROM NITROGEN WITH STOICHIOMETERIC FLOW
OF HYDROGEN

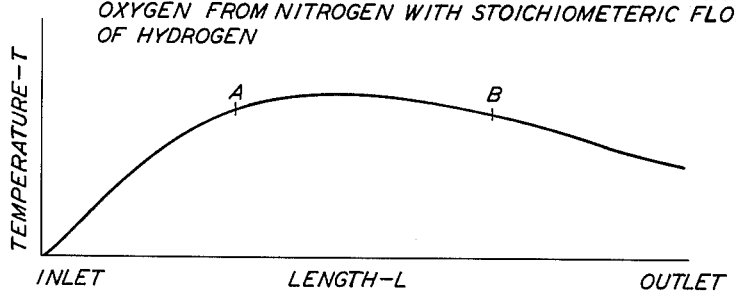

FIG. 3C

TEMPERATURES IN REACTOR CATALYST BED REMOVING
OXYGEN FROM NITROGEN WITH INSUFFICIENT HYDROGEN

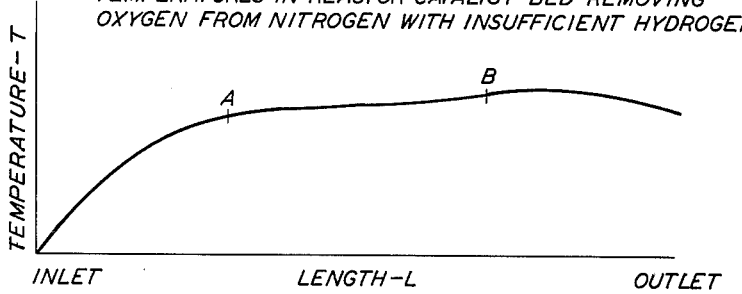

INVENTOR
ALVIN W. ANGERHOFER
BY
AGENT & ATTORNEY

United States Patent Office 3,240,554
Patented Mar. 15, 1966

3,240,554
METHOD OF REMOVING OXYGEN FROM RELATIVELY INERT CRUDE GASES
Alvin W. Angerhofer, Edison, N.J., assignor to Air Reduction Company, Incorporated, New York, N.Y., a corporation of New York
Filed Feb. 27, 1961, Ser. No. 91,950
3 Claims. (Cl. 23—2)

This relates in general to the purification of relatively inert gases, and more specifically to regulation of the quantity of reducing or oxidizing components entering the mixture of gases under treatment.

In accordance with a widely employed prior-art technique, relatively inert gases, such as nitrogen and argon, are treated for the removal of oxygen or hydrogen impurities by converting the same to water vapor, which is readily removed by drying agents. This process involves introducing into the gas undergoing purification, amounts of hydrogen or oxygen, in excess of the stoichiometric requirement for converting the impurity to water, and subsequently passing the mixture through a catalytic chamber to induce the desired reaction. This is known in the art as the catalytic "burn-out" process.

One of the problems inherent in the catalytic burn-out process is the removal of the excess amounts of hydrogen or oxygen which remain after catalyzation. Several methods have been devised for coping with this problem, which up to the present have only been partially successful. In accordance with one prior-art method, the desired stoichiometric relationship between the impurities and the reducing or oxidizing agents, is maintained by recycling a portion of the purified gas in an amount which depends on the purity of the output gas. In accordance with another method, the excess hydrogen, for example, is separated from the gas under purification by passage through a rectification column where the purified gas becomes part of the residue and the hydrogen is removed as a vapor. Still another prior-art method relies on chemical analysis of the gas passing through or exhausted from the catalytic chamber to control the quantities of hydrogen or oxygen introduced into the stream of gas, undergoing purification, ahead of the catalytic chamber.

The aforesaid prior-art methods have several disadvantages, the principal of which is the considerable time-lag which intervenes between detection of the output impurity content, and regulation of the intake of hydrogen or oxygen into the system for the burn-out process. As a result of this lag, gas of substandard purity passes into the output for substantial periods before correction is made. This also causes considerable waste of the hydrogen or oxygen purifying agent which is uneconomical. For example, using prior-art methods of controlling the burn-out process it has been found that crude nitrogen initially containing 0.3 percent by volume of oxygen can be processed to contain less than 2 parts per million of oxygen, but it still retains at least 0.4 percent of hydrogen.

Accordingly, it is a general object of the present invention to improve the purification of inert gases; and more particularly, to improve the operation of the catalytic burn-out process, specifically by substantially reducing the time-lag in regulating the hydrogen and oxygen intake ahead of the catalytic chamber, and by substantially decreasing the amount of hydrogen impurity in the output product.

These and other objects are accomplished in accordance with the present invention in a modification of the catalytic burn-out process whereby the intake of hydrogen or oxygen into the system ahead of the catalytic chamber is controlled in response to a variation in the position of the maximum temperature zone in the catalyst.

In accordance with a specific example, the present invention contemplates the addition of hydrogen gas at a pressure slightly above atmospheric pressure to a stream of nitrogen under purification, containing, for example, from less than one-tenth of one percent to about one percent by volume of oxygen, the latter at approximately atmospheric pressure. After the mixture has been compressed to a gauge pressure within the range 1,500 to 2,600 pounds per square inch, and has been passed through conventional drying and heating means, it is exposed to a bed of catalyst where the added hydrogen reacts with the oxygen impurity to form water vapor.

As the mixture travels through the bed of catalyst, the hydrogen in the crude gas is first absorbed on the catalyst surface. Oxygen in the mixture passing through then reacts with the absorbed hydrogen to form water vapor. As the water is formed and expelled from the catalytic reactor, more hydrogen is adsorbed, repeating the cycle of adsorption of hydrogen, reaction with the oxygen impurity, and expulsion of the resultant water with the effluent gas. It has been discovered in accordance with the present invention that for every one tenth of one percent of oxygen impurity reacting with the hydrogen in the bed of catalyst, the temperature of the stream of gas rises about 29° F. with a rise in the temperature of the surrounding material. When the adsorbed hydrogen exceeds the amount required to reduce all of the oxygen impurity present in the inflowing gas, the reaction, and hence, the area of maximum temperature moves nearer the inlet of the reactor, the warm gas cooling down as heat is lost from the uninsulated reactor vessel. Some of the excess hydrogen is adsorbed on the surface of the catalyst downstream from the reaction zone. When the surface of the catalyst is saturated with hydrogen, the hydrogen remaining after all of the oxygen impurity has been reduced leaves with the product. When the amount of hydrogen entering the reactor is below the requisite amount for complete removal of the oxygen impurity, the oxygen which remains beyond the initial reaction zone reacts with hydrogen stored or adsorbed on the catalyst downstream from the inlet. Thus, the reaction zone, and hence the zone of maximum temperature moves downstream from the inlet of the reactor. Accordingly, the position of the maximum temperature area in the catalytic bed is a function of the relationship between oxygen impurity in the gas under treatment and the hydrogen added to reduce the impurity to water.

In accordance with the present invention, it is contemplated that either a single differential thermocouple, or alternatively, a plurality of thermosensitive elements, such as a thermopile having bundle-ends of different polarity, are disposed in different positions along the path of travel of the reacting gases in the catalytic chamber. The differential thermocouple, or the series of thermosensitive elements, is symmetrically connected with respect to a selected reference position which is determined by calibration to be the maximum temperature zone when the oxygen impurity and the added hydrogen are in stoichiometric equilibrium. Thus, the positions of the thermosensitive elements are so arranged that the intensities and polarities of the electrical signals which they generate vary with the movement of the maximum temperature zones upstream or downstream following the area of maximum chemical activity as the added hydrogen exceeds the oxygen impurity, or vice versa. According to the present invention, the differential electrical output so generated is employed to actuate a pneumatic device, or other servo mechanism, which controls a valve ahead of the catalytic chamber to regulate the intake of hydrogen.

Utilizing the control system of the present invention to implement the catalytic burn-out process, it has been possible to process nitrogen having a 0.3 percent oxygen impurity to an end product which contains less than 20 parts per million of oxygen, and less than 0.1 percent of hydrogen. Moreover, a particular feature of the present invention is that flow correction of the added hydrogen is begun as soon as the measured variable begins to change at a different rate, thus speeding the control about five minutes over prior-art control systems.

These and other features and advantages of the present invention will be better understood by a detailed study of the specification and claims hereinafter with reference to the attached drawings, in which:

Figure 2A:
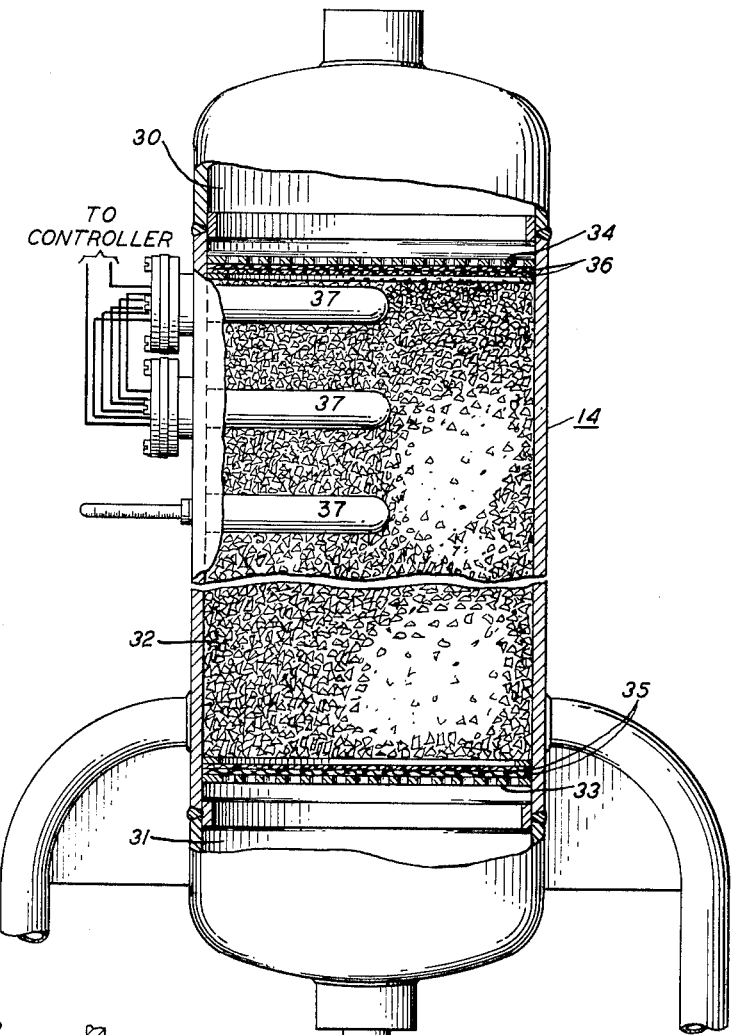
Figure 2B:
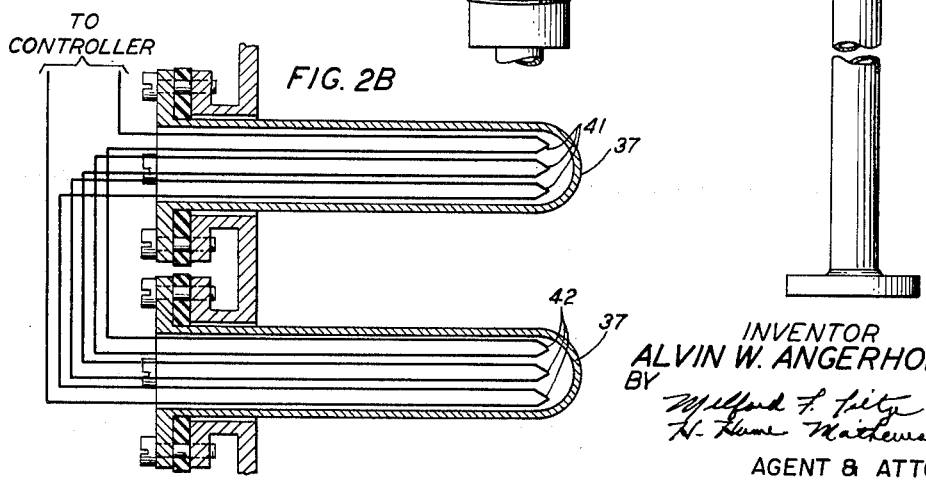

FIGURE 2A is an enlarged showing, in side elevation, of the catalytic reactor 14, broken away to show the catalyst-packed interior of chamber 32 and the thermowells 37;

FIGURE 2B is an enlarged cross-sectional showing of two of the thermowells 37, which serve as receptacles for two junctions of the thermopile; and FIGURES 3A, 3B, and 3C are graphical representations of temperature plotted against length measured along the path of the flow of gas in the catalytic bed 32 of reactor 14. In FIGURE 3A, the added hydrogen is in excess of the oxygen impurity; in FIGURE 3B, the oxygen and hydrogen are in stoichiometric balance; and in FIGURE 3C, the oxygen impurity exceeds the added hydrogen.

Although the techniques and apparatus of the present invention are applicable to the purification of any gas so constituted chemically that it does not enter into the reaction during the catalytic burn-out process, or cause subsantial deactivation of the catalyst, the invenion will be discussed hereinafter, by way of illustration, with specific reference to a system for the purification of nitrogen containing from less than one-tenth of one percent to about one percent by volume of oxygen impurity.

For convenience, the nitrogen under purification is initially stored in a container 1, which may comprise, for example, a plastic balloon, or steel shell, maintained at room temperature and at a pressure slightly exceeding atmospheric, so that when the valve thereof is opened, the crude nitrogen bearing oxygen impurity flows through the intervening pipe system 2 to the junction 3. At that point, for preferred results, electrolytic hydrogen, or hydrogen having a purity of not less than 99.95 percent by volume, and containing no impurities capable of poisoning the catalyst, is admitted at substantially atmospheric pressure to the crude gas stream by operation of the intake valve 5, which is subject either to manual operation or to an automatic control system, the operation of which will be discused in detail hereinafter.

For best results in the practice of the present invention, the gaseous mixture so formed is compressed to a gauge pressure within the range 2,300 to 2,600 pounds per square inch in the compressor 6. In preferred form, the latter is of a type which does not employ a contaminating lubricant, such as a water-lubricated reciprocating piston compressor. The bulk of the water from the compressing process may be removed in any of the usual ways, such as by a baffle separator, not shown.

After compression, the crude nitrogen mixture passes through an intervening conduit into a water-cooled chamber 7, where the heat generated by compression is removed, returning the gas to about room temperature.

Next, the stream of gas enters a conduit 8, where it passes in succession through a pair of conventional purge bottles 9 and 10, which are elongated steel shells, upon the walls of which the bulk of water remaining in the gas stream is coalesced, and permitted to drain off periodically or intermittently, through a valve.

The gaseous mixture is further dried, for example, by passing it through a centrifugal separator 11 of conventional design, where the gas, being relatively light, is collected at the center and the remaining water is thrown off at the periphery.

As a final step before entering the catalytic chamber 14, where it is subjected to the burn-out process, the gas passes through conduit 12, which is surrounded by the electrical resistance coils of preheater 13, a conventional, alternating-current radiant-coil heater which serves to bring the gaseous mixture to a temperature within the range 130 to 170° F., and preferably, within the narrower range 140 to 160° F., preparatory to its entry into the catalytic chamber 14. A bulb 13a is placed against the pipe to actuate a thermostatic temperature control.

The over-all system is so adjusted that the rate of flow of crude gas mixture into the catalytic chamber 14 is between 5,000 and 10,000 standard cubic feet per hour. Using the arrangement under description, the most successful results have been obtained with a flow-rate of 6,700 standard cubic feet per hour into the catalytic chamber.

In preferred form, the catalytic burn-out chamber 14, which is shown in enlarged elevation in FIGURE 2A of the drawings, comprises a cylindrical steel shell having a thickness of, for example, about 1.3 inches, an inner diameter of about one foot, and a long axis of about five feet. The overall chamber is divided into three parts, a hollow inlet chamber 30, a hollow outlet chamber 31, and a mid-section chamber 32 about four times the combined lengths of the other two sections, in which pellets of catalytic material are packed between layers of wire mesh backed up by perforated steel plates respectively positioned about a half-foot from each of the ends of chamber 14. Each of plates 33 and 34 has, for example, about 180 perforations each ⅜ inch across; and each of the sides facing the pellets is covered with several layers of wire-mesh screen, 35 and 36 of nickel wire, or the like, one screen comprising, for example, 16 by 16 mesh of 0.35 inch wire, and another screen comprising 4 by 4 mesh of 18 gauge wire.

In the embodiment under description, the catalytic material packed into the chamber 32, which serves to induce the flameless reaction between the oxygen impurity and the added hydrogen to form water, comprises pellets of from ⅛ to ¼ inch in diameter, and approximately the same length, which are coated with palladium in the manner described in detail in Rosenblatt patent, 2,582,885; January 15, 1952.

However, it will be apparent to those skilled in the art that other catalytic agents or combinations of agents can be substituted to perform the functions required in the process of the present invention, that is, the adsorption of excess hydrogen and catalyzation of the reaction between oxygen and hydrogen, with the giving off of heat during the reaction process. For example, other catalysts useful for the purposes of the present invention are finely divided silver, platinum, and other metals of the 8th periodic group. Also useful for this purpose are certain oxides, such as the oxides of copper which undergo a conversion from the cupric form to the cuprous form and vice versa; and the oxides or manganese which are subject to a similar conversion.

As explained in the earlier part of the specification, the chemical cycle, which includes first, the adsorption of hydrogen in the bed of the catalyst, then reaction of the oxygen impurity in the crude gas with the adsorbed hydrogen to produce water vapor, and subsequent expulsion of the water vapor so formed, causes an accompanying cycle of temperature changes whereby the temperature of the nitrogen under treatment and the surrounding bed of catalyst rises about 29° F. for every one-tenth of one percent of oxygen reacting with the hydrogen. As quickly as water vapor is formed and expelled, more hydrogen goes through the adsorption reaction and expulsion cycle. However, due to the uninsulated character of the reactor vessel, the warm gas quickly cools down.

As the gaseous mixture enters the reactor, hydrogen is adsorbed on the surface of the catalyst, both at points near the inlet to the chamber, and downstream therefrom as the gas passes towards the outlet. When the adsorbed hydrogen is plentiful, most of the reactions occur near the inlet; but if the hydrogen supply becomes depleted, the maximum reaction site moves downstream in the chamber. Consequently, the area of maximum temperature is close to the inlet when the hydrogen added to the gaseous mixture exceeds the amount for stoichiometric combination with the oxygen impurity, moving downstream as the oxygen and hydrogen come into stoichiometric balance, and still further downstream as the oxygen impurity exceeds the added hydrogen.

FIGURE 3A of the drawing is a graphical representative of temperature plotted against distance measured along the path of travel of the gaseous stream through the catalytic chamber 32, for the condition in which hydrogen exceeds the stoichiometric requirement. The letters A and B represent two points in the chamber 32, upstream and downstream respectively. In FIGURE 3A, the temperature at A is substantially higher than the temperature at B. In FIGURE 3B, which represents the condition of stoichiometric balance between the added hydrogen and the oxygen impurity in the gaseous stream, points A and B are at substantially equal temperatures. However, under the condition shown in FIGURE 3C, in which the added hydrogen is insufficient to react with all of the oxygen impurity, point B downstream is at substantially higher temperature than point A near the inlet.

FIGURE 3B is representative of many positions of the maximum temperature zone, which will result in complete removal of oxygen with no excess of hydrogen. As long as the maximum temperature zone does not reach the position shown as 3A, no excess hydrogen will pass. As long as the maximum temperature zone does not extend beyond the position shown as 3C, all of the oxygen will be removed. The reserve supply of hydrogen adsorbed on the catalyst prevents rapid movement of the maximum temperature zone to either extreme before hydrogen flow rate can be corrected. It is not necessary to continuously add exactly the stoichiometric amount of hydrogen, provided the supply rate does not deviate from the exact stoichiometric quantity long enough for adsorption capacity to be filled ahead of the control zone or adsorbed hydrogen to be depleted after the control zone.

In accordance with the present invention, the phenomenon which has been described in detail in the foregoing paragraphs is utilized to maintain the desired stoichiometric relationship between the added hydrogen and the oxygen impurity by embedding one or more differentially thermosensitive elements in the catalytic bed, along the path of flow of the gas. While this object can be accomplished with one differential thermocouple element which is sensitive to the space-temperature variation along the path of gas flow through the catalyst, it is preferably accomplished using a plurality of thermosensitive devices. In the present illustrative embodiment good results have been obtained using from twenty to fifty thermocouples, junctions of copper and constantan, connected in series to form a differential thermopile. A first bundle 41, comprising all of the thermocouple junctions of one polarity is placed closest to the inlet end; and another bundle 42 comprising all of the thermocouple junctions of the other polarity is placed closest to the outlet end.

FIGURE 2A is an enlarged view of the catalytic chamber 14, showing the thermowells 37, each of which is about ¼ inch in inside diameter and 6 inches deep, recessed in the outer shell. The first thermowell is located about an inch down from the inlet of chamber 32, and extends inwardly in a direction substantially normal to the direction of gas flow. The other two thermowells are disposed parallel to the first, and therebelow, at intervals about six inches apart. In preferred arrangement, the upper two thermowells 37 are utilized as repositories for thermopile bundles 41 and 42, the lower being used for measuring devices. FIGURE 2B is a detailed cross-sectional showing of two of thermowells 37, with the insulating cover of bundles 41, 42 broken away to show the wires.

It will be apparent to those skilled in the art that although a specific arrangement of thermopiles and thermowells has been described by way of illustration, many different arrangements are possible in the practice of the present invention.

The oppositely polarized bundles 41 and 42 of the thermopile have their terminals connected to opposite ends of an adjustably biased potentiometer 23, which is connected to drive an electro-mechanical converter 38, the armature of which actuates a pneumatic system 35 to seat or unseat the hydrogen intake valve 5 to a degree which is a function of the position of the maximum temperature area in the catalytic chamber 32. A voltage indicator device 39 designed to draw minimal current is connected across the potentiometer 23. Although a pneumatic system has been found convenient for actuating the intake valve 5 in accordance with electrical signals applied across the potentiometer 23, it will be apparent that this function could be performed in numerous other ways, well-known in the art, using various combinations of electrical relay apparatus and mechanical gear systems.

Before the control system can be relied on to actuate the intake valve 5 in such a way as to maintain the desired relationship between the oxygen impurity and the added hydrogen, the bias on potentiometer 23 is necessarily adjusted to a preselected position by calibration.

The calibration is carried out in the following manner. The gas from the outlet of the catalytic chamber 14 is passed through the remainder of the system, including the aftercooler 15, where the gaseous mixture is again water-cooled to bring it approximately to room temperature, the solenoid-controlled purge-bottle 16 which operates to periodically drain off the accumulated water, and the wet and dry desiccators 17 and 18 which may include, for example, silica gel and alumina for further drying the moisture from the effluent gases. The output gas from the dry desiccator 18 is then passed through the output conduit 19, where a small proportion is diverted to pass at a controlled rate of flow through conduit 20 for analysis, partly in the trace oxygen analyzer 21, and partly in the hydrogen analyzer 22, which serve to detect and measure small quantities of hydrogen or oxygen remaining in the product gas flowing out of the reactor 14. On the basis of the readings of the oxygen and hydrogen analyzers 21 and 22, potentiometer 23 is adjusted to give a null-point deflection on the indicating device 39.

Devices for measuring the concentrations of oxygen and hydrogen are well known in the art, and may be obtained commercially. For the purposes of the present invention, the oxygen detection device 22 may employ the principle of the galvanic cell, having, for example, a silver cathode, and an anode of active cadmium, the electrodes being separated by a porous tube saturated with an electrolyte such as potassium hydroxide. Alternatively, a different type of device may be utilized, wherein the traces of oxygen are detected and measured by observing the increase in temperature of the gas which will result from catalytic combination of the oxygen impurity with hydrogen generated in a self-contained electrolytic cell and mixed with the sample. The sensitive oxygen indicator 22, of whichever, type, is calibrated to measure oxygen impurity concentrations from less than one to several hundred parts per million.

In a similar manner, the concentrations of hydrogen in the gas exhausted from chamber 14 are measured in the indicator 21. For example, in a temperature-detection device of the second type described above, there may be an impurity selector switch which reverses the electroltyic cell circuit, an excess quantity of oxygen instead of hydrogen being introduced into the sample of gas. The instrument will then detect small amounts of hydrogen in the exhaust gas, within the desired range.

After the system has been properly calibrated, the gas exhausted from the reactor 14 is passed to the aftercooler 15, the drying circuits 16, 17, and 18, and conduit 19, to the valve 25, which is opened after a storage cylinder 40 is screwed into hermetically sealed receiving relation to the conduit system, to permit loading of the purified gas for storage or delivery.

The following table gives actual test values used in practice of the present invention in a system for removing oxygen impurity from crude nitrogen, showing the purity of the final product with respect to oxygen and hydrogen.

| Oxygen in raw nitrogen, percent | Reactor temperature, °F. | | Product impurity in output nitrogen | | Compressor discharge pressure, P.s.i.g. |
|---|---|---|---|---|---|
| | In | Out | Percent H$_2$ | P.p.m. O$_2$ | |
| 0.12 | 160 | 133 | 0.02 | 6.0 | 1,600 |
| 0.52 | 162 | 134 | 0.10 | 2.0 | 1,700 |
| 0.27 | 147 | 136 | 0.08 | 1.0 | 1,700 |
| 0.14 | 148 | 136 | 0.01 | 1.0 | 1,600 |
| 0.14 | 152 | 138 | 0.20 | 0.9 | 1,800 |
| 0.07 | 152 | 140 | 0.29 | 0.9 | 1,800 |
| 0.15 | 139 | 129 | 0.03 | 1.9 | 1,800 |
| 0.23 | 140 | 130 | 0.09 | 1.3 | 1,900 |
| 0.23 | 140 | 130 | 0.01 | 1.0 | 1,900 |

In the foregoing table, p.s.i.g. stands for gauge pressure, and p.p.m. stands for parts per million.

Figure 1A:
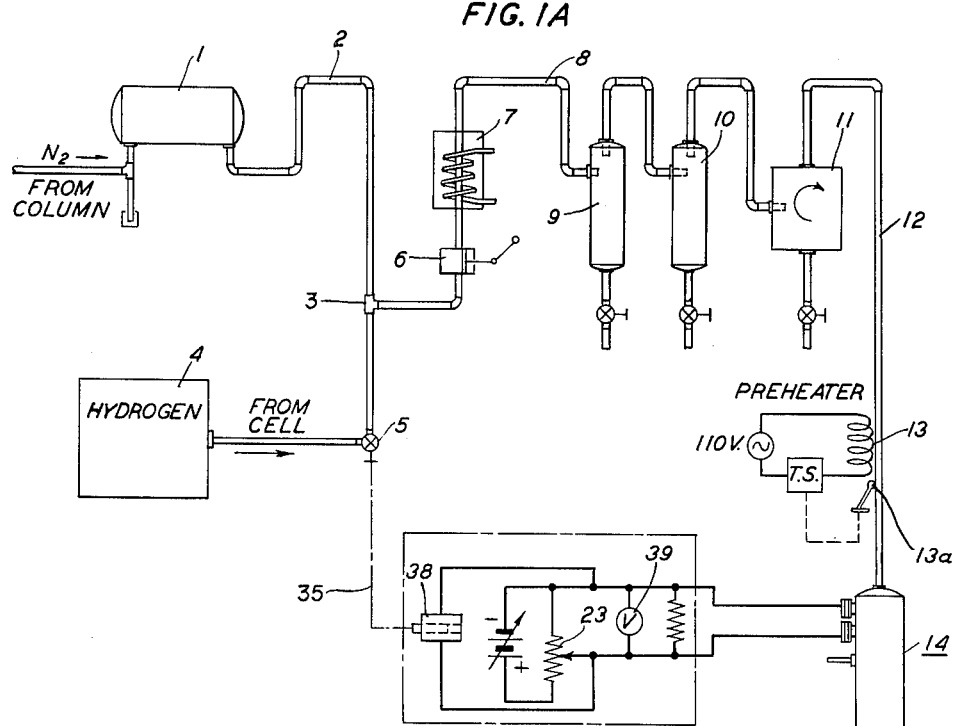
FIGURE 1A is a schematic arrangement of an illustrative purification system for relatively inert gases including the novel control system of the present invention.
Figure 1B:
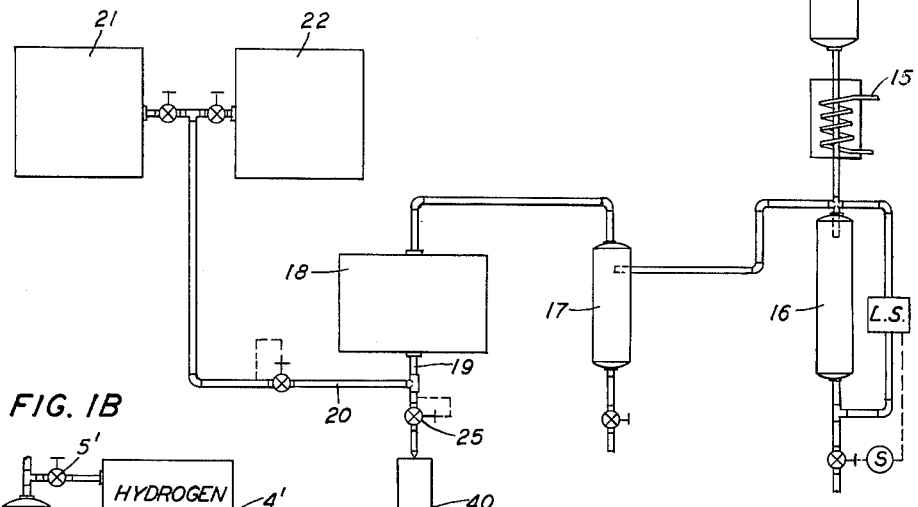
FIGURE 1B shows a slight modification of the system of FIGURE 1A, wherein the hydrogen intake valve is disposed just ahead of the catalytic reactor.

In accordance with another embodiment of the present invention, the apparatus shown in FIGURE 1A is modified to provide almost immediate response of the hydrogen intake valve to the control circuit by removing the valve 5 from the position shown in FIGURE 1A to an alternative position 5' which is immediately ahead of the reactor 14' as indicated in FIGURE 1B. Before entering the valve 5', the feed hydrogen is raised to a pressure of the order of the crude gas entering the reactor 14', say, for example, 2,500 pounds per square inch gauge pressure. In order to avoid the inconvenience of working with an extremely small hydrogen intake valve because of the small volume of hydrogen at the high pressures, it is contemplated that the hydrogen to be added will be mixed with a proportion of nitrogen of established purity or other gas under test, to obtain the desired volume.

It will be apparent to those skilled in the art that the scope of the present invention is not restricted to any specific apparatus or combinations of apparatus shown herein by way of illustrating the principles of the present invention. Moreover, although certain theories have been advanced in this specification as possible bases for the successful operation of the present invention, the scope of the appended claims is not deemed to be restricted or circumscribed by the correctness of such theories as applied to the present invention.

What I claim is:

1. In a process for removing oxygen impurity from a relatively inert crude gas, the steps comprising introducing hydrogen gas into said crude gas, contacting said crude gas including said impurity and said hydrogen gas with a catalyst at a gauge pressure of between about 2,300 and 2,600 pounds per square inch and at a temperature in the range of about 130° F. to 170° F., said hydrogen gas being absorbed by said catalyst and said oxygen impurity reacting with the absorbed hydrogen on said catalyst to form water, regulating the intake of hydrogen into the crude gas in stoichiometric relation to said oxygen impurity by (1) continuously deriving thermoelectric signals from each of a plurality of stationary positions imbedded within said catalyst, which signals vary as the temperature gradient established in said catalyst by the progressive reaction of said constituents to form water and (2) utilizing the aggregate of said signals so derived to control the introduction of hydrogen into said crude gas in accordance with said temperature gradient, and removing substantially all of said water from said crude gas.

2. In a process for removing oxygen impurity from a relatively inert crude gas, the steps comprising introducing hydrogen gas into said crude gas, contacting said crude gas including said impurity and said hydrogen gas with a catalyst bed having an inlet end and an outlet end, at a gauge pressure of between about 2,300 and 2,600 pounds per square inch and at a temperature in the range of about 130° F. to 170° F., said hydrogen gas being absorbed by said catalyst, said oxygen impurity reacting with the absorbed hydrogen on said catalyst to form water and said oxygen impurity being converted to water in an exothermic reaction producing a maximum temperature spot in said catalyst which shifts toward said outlet end in the case of an excess of said oxygen impurity over said hydrogen and which spot shifts toward said inlet end in the case of an excess of said hydrogen over said oxygen impurity, continuously deriving thermoelectric signals from each of a plurality of stationary positions in said catalyst bed which are spaced apart in the direction of said flow and which signals vary individually in accordance with the position of said maximum temperature spot in said catalyst, utilizing the aggregate of said signals which varies in accordance with the space rate of change of temperature in the range of flow in said catalyst to control the quantity of hydrogen in said mixture in substantially stoichiometric relation to said oxygen impurity, and removing the water in the stream of gas emerging from said outlet.

3. A process as claimed in claim 2, the inert crude gas being substantially composed of nitrogen.

References Cited by the Examiner

UNITED STATES PATENTS

| | | | |
|---|---|---|---|
| 1,923,865 | 8/1933 | Handforth | 23—288 X |
| 2,285,716 | 6/1942 | Hulsberg | 23—288 |
| 2,373,888 | 4/1945 | Hachmuth | 23—288 |
| 2,582,885 | 1/1952 | Rosenblatt | 23—2.1 |
| 2,646,681 | 7/1953 | Walton | 23—1 |
| 2,826,480 | 3/1958 | Webster | 23—2.1 |
| 3,017,256 | 1/1962 | Richardson | 23—288 |

MAURICE A. BRINDISI, *Primary Examiner.*